United States Patent
Wu (10) Patent No.: US 8,427,587 B2
(45) Date of Patent: Apr. 23, 2013

(54) TRACKING FILTER AND ASSOCIATED CALIBRATION DEVICE

(75) Inventor: Chao-Huang Wu, Taoyuan County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 288 days.

(21) Appl. No.: 13/071,063

(22) Filed: Mar. 24, 2011

(65) Prior Publication Data
US 2011/0242431 A1 Oct. 6, 2011

(30) Foreign Application Priority Data

Mar. 30, 2010 (TW) .............................. 99109669 A (51) Int. Cl.
*H04N 5/50* (2006.01)
(52) U.S. Cl.
USPC .......................................... 348/731; 348/733
(58) Field of Classification Search .................. 348/725, 348/728, 731–733; 455/130, 290–293, 303–307, 455/338–340; 334/45, 47, 48, 40, 52, 55, 334/56, 69, 71, 78, 65, 66; *H04N 5/44, 5/50*
See application file for complete search history.

(56) References Cited

U.S. PATENT DOCUMENTS 7,539,470 B2  5/2009  Kim et al.
8,188,806 B2 *  5/2012  Ho et al. ......................... 334/45

OTHER PUBLICATIONS

Jean Robert Tourret; Sebastien Amiot, Member, IEEE; Maxime Bernard, Mohamed Bouhamame; Claude Caron; Olivier Crand; Gilles Denise; Vincent Fillatre; Thibault Kervaon; Markus Kristen; Luca Lo Coco; Frederic Mercier; Jean Marc Paris; Francois Pichon; Sebastien Prouet; Vincent Rambeau; Sebastien Robert; Jan Van Sinderen; Member, IEEE; Olivier Susplugas, "SiP Tuner With Integrated LC Tracking Filter for Both Cable and Terrestrial TV Reception", December.

V. Fillatre, J.R. Tourret; S. Amiot; M. Bernard; M. Bouhamame; C. Caron; O. Crand: A. Daubenfeld; G. Denise; T. Kervaon; M. Kristen, L. Lo Coco; F. Mercier; J.-M. Paris; S. Prouet; F. Rambeau; S. Robert. F. Seneschal; J. Van Sinderen; O. Susplugas, "A SiP Tuner with Integrated LC Tracking Filter for both Cable and Terrestrial TV Reception", 2007, p. 208-209; p. 597, IEEE International Solid-State Circuits Conference.

* cited by examiner

*Primary Examiner* — Sherrie Hsia
(74) *Attorney, Agent, or Firm* — WPAT PC; Justin King (57) ABSTRACT

A tracking filter includes a first buffer, an impedance transformer, an inductor, a first capacitive unit, a second capacitive unit and a second buffer. The first buffer has an input terminal for receiving an input signal. The impedance transformer is connected with an output terminal of the first buffer. The inductor is connected with a second terminal of the impedance transformer. The first capacitive unit is interconnected between the impedance transformer and a ground terminal. The second capacitive unit is interconnected between the inductor and the ground terminal. The second buffer is connected with the inductor for generating an output signal. When specified values of the impedance transformer, the first capacitive unit and the second capacitive unit are simultaneously increased, an operating frequency of the output signal is decreased, so that a gain value of the output signal to the input signal is maintained constant.

14 Claims, 10 Drawing Sheets

TRACKING FILTER AND ASSOCIATED CALIBRATION DEVICE

This application claims the benefit of Taiwan application Serial No. 99109669, filed Mar. 30, 2010, the subject matter of which is incorporated herein by reference.

FIELD OF THE INVENTION

The present invention relates to a tracking filter and a calibration device thereof, and more particularly to a high-linearity tracking filter and a digital calibration device thereof.

BACKGROUND OF THE INVENTION

Figure 1:
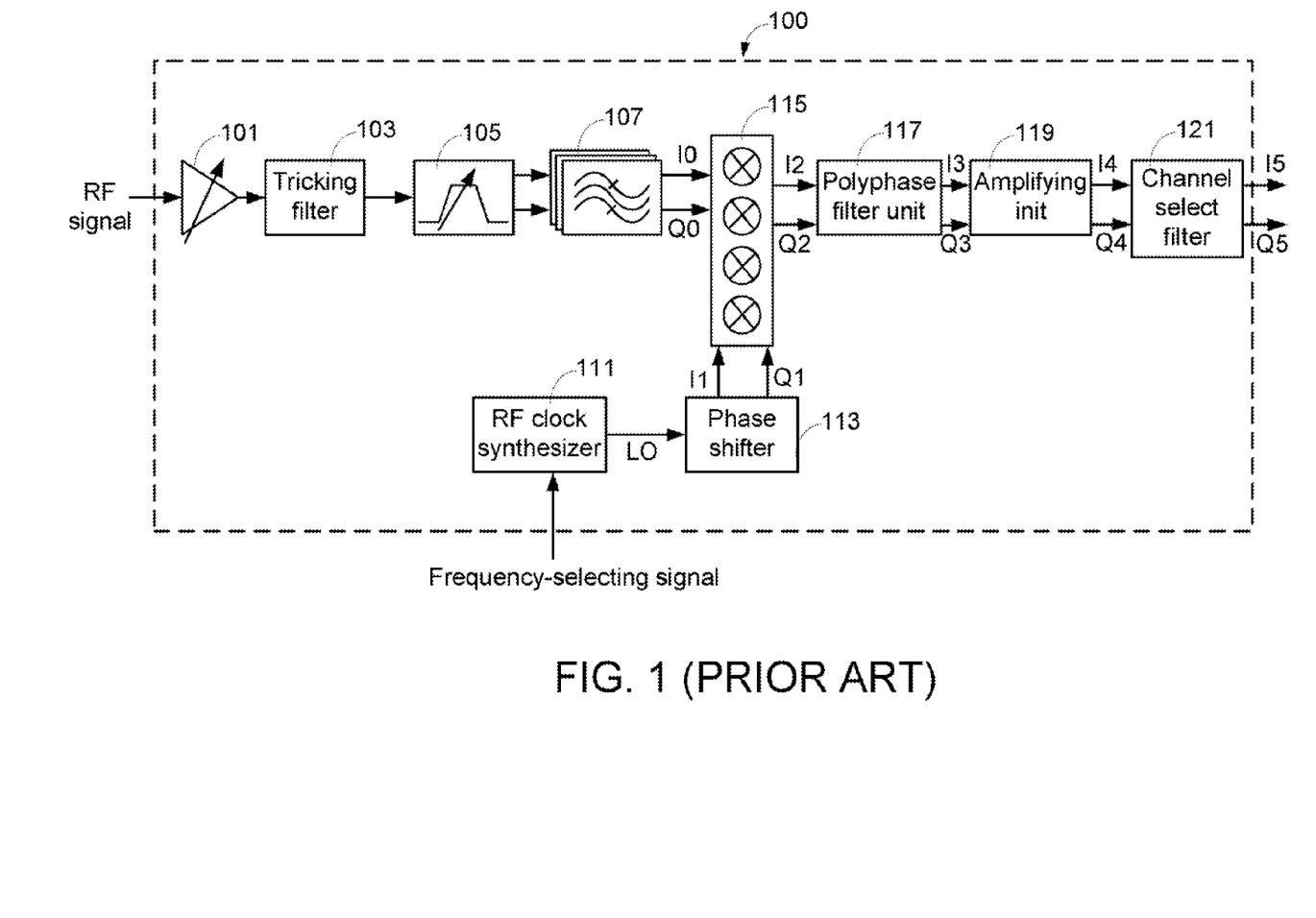
FIG. 1 is a schematic functional block diagram illustrating the architecture of a conventional TV tuner.

FIG. 1 is a schematic functional block diagram illustrating the architecture of a conventional TV tuner. As shown in FIG. 1, the TV tuner 100 comprises a low noise amplifier (LNA) 101, a tracking filter 103, a band-pass filter 105, a quadrature generator 107, a RF clock synthesizer 111, a phase shifter 113, a double quadrature mixer 115, a polyphase filter unit 117, an amplifying unit 119 and a channel select filter 121.

After a RF signal (or a wideband TV signal) is received by the low noise amplifier 101, the RF signal is amplified to a certain level. In addition, the gain value of the low noise amplifier 101 is controlled by an automatic gain control (AGC) loop. The output signal from the low noise amplifier 101 is transmitted to the quadrature generator 107 through the tracking filter 103 and the band-pass filter 105. According to the output signal from the band-pass filter 105, the quadrature generator 107 generates a set of quadrature signal I0 and Q0.

The quadrature generator 107 is for example a multi-stage passive polyphase filter. By switching different passive components, the center frequency of the passive polyphase filter may be adjusted in order to comply with different frequency bands. Consequently, by the quadrature generator 107, the output signal from the band-pass filter 105 may be converted into an in-phase signal I0 and a quadrature-phase signal Q0.

In response to a frequency-selecting signal, the RF clock synthesizer 111 generates a local oscillation signal LO according to the preset type of the TV tuner 100. The frequency-selecting signal is generated according to the channel selected by the user. For example, in a case that the TV tuner 100 is set as a digital TV tuner, the system is switched to a zero intermediate frequency configuration, and the frequency of the local oscillation signal LO is set to be the frequency of the selected channel. Whereas, in a case that the TV tuner 100 is set as an analog TV tuner, the system is switched to a low intermediate frequency configuration, and the frequency of the local oscillation signal LO is set to be slightly higher than the frequency of the selected channel by several hundreds of thousand hertz (KHz).

Then, the phase shifter 113 shifts the phase of the local oscillation signal LO is by 90 degrees to generate two quadrature signals I1 and Q1. The signals I0 and Q0 outputted from the quadrature generator 107 and the signals I1 and Q1 outputted from the phase shifter 113 are mixed by the double quadrature mixer 115, and thus two base frequency (or low intermediate frequency) quadrature signals I2 and Q2 are produced. In a case that the TV tuner 100 is set as a digital TV tuner, the signals I2 and Q2 are base band frequency signals. Whereas, in a case that the TV tuner 100 is set as an analog TV tuner, the signals I2 and Q2 are low intermediate frequency signals.

If the signals I2 and Q2 are low intermediate frequency signals, the desired channel of the signals I2 and Q2 are allowed to pass through the polyphase filter unit 117 but the mirror channels of the signals I2 and Q2 are filtered off. Whereas, if the signals I2 and Q2 are base band frequency signals, the signals I2 and Q2 are allowed to directly pass through the polyphase filter unit 117. Consequently, the polyphase filter unit 117 generates the signals I3 and Q3. The signals I3 and Q3 are successively processed by the amplifying unit 119 and the channel select filter 121, so that desired signal I5 and Q5 are produced.

Figure 2A:
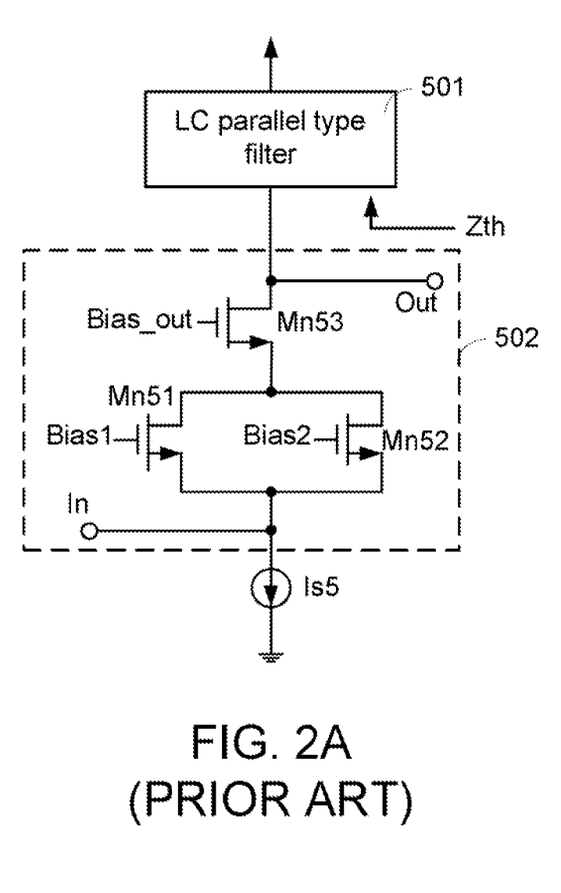
FIG. 2A is a schematic diagram illustrating a tracking filter disclosed in U.S. Pat. No. 7,539,470.

Generally, the tracking filter of the TV tuner should have high linearity and low noise figure in order to filter off undesired frequency band and noise of the RF signal and eliminate the adverse influence on the back-end circuit. FIG. 2A is a schematic diagram illustrating a tracking filter disclosed in U.S. Pat. No. 7,539,470. As shown in FIG. 2A, the LC parallel type filter 501 is a tracking filter. The LC parallel type filter 501 is connected with an amplifier 502 in series. The amplifier 502 comprises a first transistor Mn51, a second transistor Mn52 and a third transistor Mn53. The gate of the first transistor Mn51 is connected with a first bias voltage Bias1. The gate of the second transistor Mn52 is connected with a second bias voltage Bias2. The drain of the second transistor Mn52 is connected with the drain of the first transistor Mn51. The source of the second transistor Mn52 is connected with the source of the first transistor Mn51, and used as a signal input terminal In. The gate of the third transistor Mn53 is connected with an output bias voltage Bias_out. The drain of the third transistor Mn53 is connected with the LC parallel type filter 501, and used as a signal output terminal Out. The source of the third transistor Mn53 is connected to the drain of the first transistor Mn51. A current source Is5 is connected to the source of the first transistor Mn51 to provide a bias current.

Figure 2B:
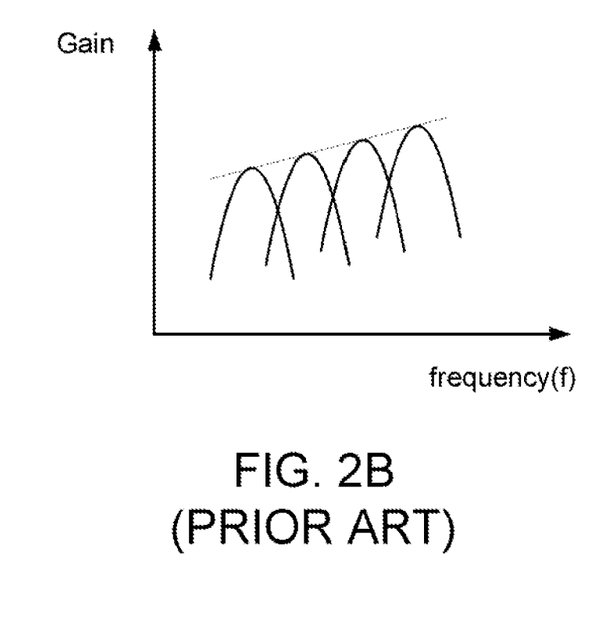
FIG. 2B is a schematic plot illustrating the relationship between the gain value and the operating frequency of the LC parallel type filter of FIG. 2A.

However, the amplifier 502 fails to simultaneously acquire high linearity and low noise figure. Moreover, as the operating frequency changes, the input impedance Zth of the LC parallel type filter 501 changes. FIG. 2B is a schematic plot illustrating the relationship between the gain value and the operating frequency of the LC parallel type filter of FIG. 2A. As shown in FIG. 2B, it is found that the gain value of the LC parallel type filter 501 is increased as the operating frequency is increased. Therefore, an additional gain compensation circuit is required to assure that the gain value of the LC parallel type filter 501 is unchanged as the operating frequency is increased.

Figure 3A:
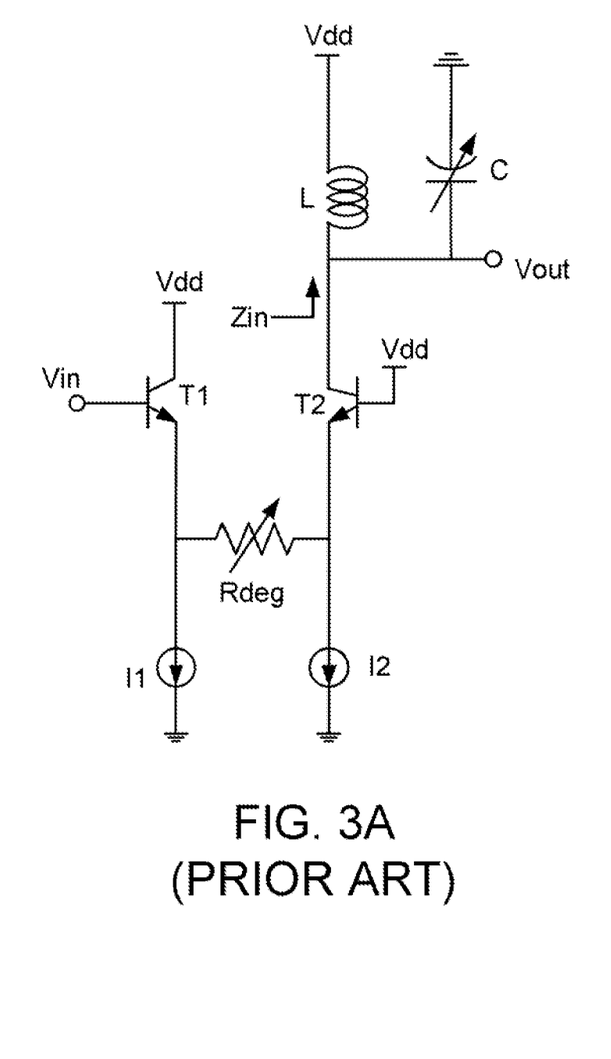
FIG. 3A is a schematic diagram illustrating another conventional tracking filter.

FIG. 3A is a schematic diagram illustrating another conventional tracking filter. As shown in FIG. 3A, the tracking filter comprises an inductor L and a capacitor C. The inductor L is interconnected between a voltage source Vdd and a signal output terminal Vout. The capacitor C is interconnected between a ground terminal and the signal output terminal Vout. The tracking filter is also connected with an amplifier in series. The amplifier comprises a first transistor T1, a second transistor T2 and a variable resistor Rdeg. The first transistor T1 has a base connected with a signal input terminal Vin, a collector connected to the voltage source Vdd, and an emitter connected with a first current source I1. The second transistor T2 has a base connected with the voltage source Vdd, a collector connected to the signal output terminal Vout, and an emitter connected with a second current source I2. The variable resistor Rdeg is connected between the two emitters of the first transistor T1 and the second transistor T2.

The capacitance value of the capacitor C may be adjusted by changing the operating frequency of the tracking filter. Assuming that the impedance of the tracking filter is Zin, the gain value of the amplifier is obtained by the following formula:

$$\text{Gain} = \frac{Zin}{Rdeg + \dfrac{2}{gm}}$$

Figure 3B:
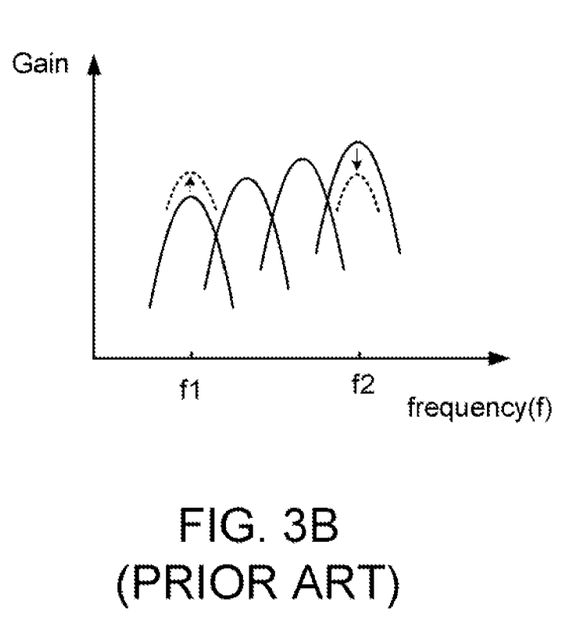
FIG. 3B is a schematic plot illustrating the relationship between the gain value and the operating frequency of the tracking filter of FIG. 3A.

FIG. 3B is a schematic plot illustrating the relationship between the gain value and the operating frequency of the tracking filter of FIG. 3A. In a case that the resistance value of the variable resistor Rdeg is unchanged, the gain value of the tracking filter is increased as the operating frequency is increased. In other words, the gain value may be compensated by changing the resistance value of the variable resistor Rdeg. For example, if the tracking filter is operated at a low operating frequency f1, the gain value of the tracking filter is increased as the resistance value of the variable resistor Rdeg is decreased. Whereas, if the tracking filter is operated at a high operating frequency f2, the gain value of the tracking filter is decreased as the resistance value of the variable resistor Rdeg is increased. In such way, the gain value does not change as the operating frequency changes.

However, in a case that the tracking filter is operated at the high operating frequency, since the resistance value of the variable resistor Rdeg is increased, the noise figure is increased. Whereas, in a case that the tracking filter is operated at the low operating frequency, since the resistance value of the variable resistor Rdeg is decreased, the linearity is impaired. Moreover, due to the parasitic effect of a printed circuit board (PCB), the Q factor of the tracking filter is deteriorated.

Figure 4A:
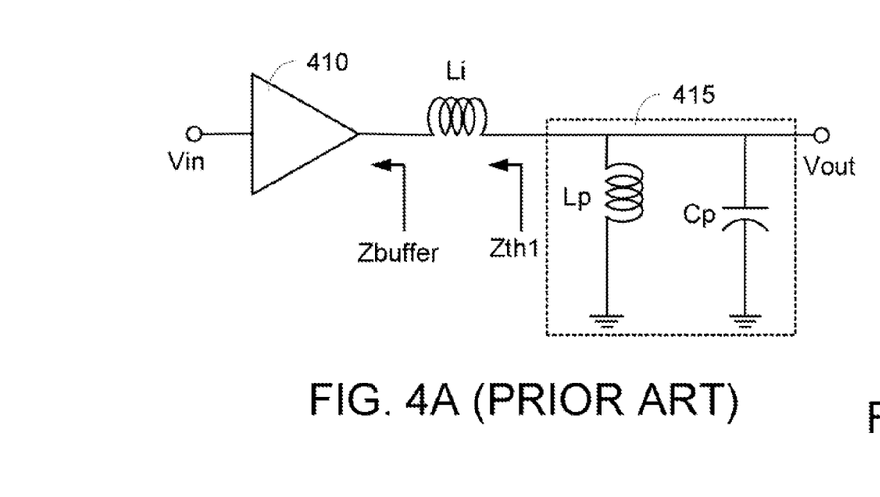
FIG. 4A is a schematic diagram illustrating another conventional LC tracking filter.

FIGS. 4A~4D schematically illustrate two other conventional LC tracking filters. These LC tracking filters are disclosed in for example IEEE ISSCC Dig. Tech., pp. 208-209, 2007, "A Sip tuner with integrated LC tracking filter for both cable and terrestrial reception". These LC tracking filters have good linearity. As shown in FIG. 4A, the LC tracking filter comprises a buffer 410, an impedance transformer Li and a resonator 415. The resonator 415 comprises an inductor Lp and a capacitor Cp. A signal input terminal Vin is connected with the buffer 410. The impedance transformer Li is interconnected between the output terminal of the buffer 410 and a signal output terminal Vout. The inductor Lp and the capacitor Cp are interconnected between the signal output terminal Vout and a ground terminal. Moreover, since the impedance value Zbuffer of the buffer 410 is low, the use of the impedance transformer Li with a high inductance value may increase the impedance value to Zth1.

Figure 4B:
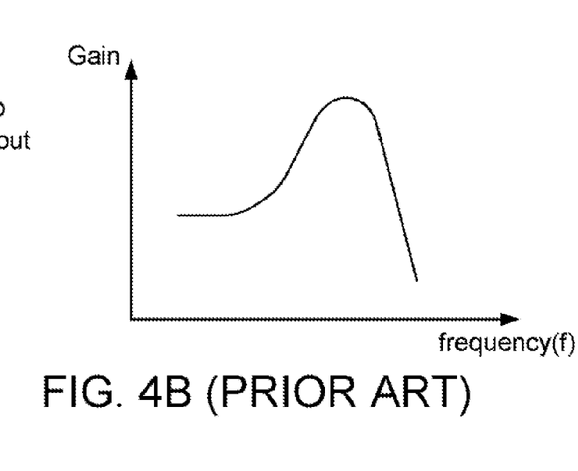
FIG. 4B is a schematic plot illustrating the relationship between the gain value and the operating frequency of the LC tracking filter of FIG. 4A.

FIG. 4B is a schematic plot illustrating the relationship between the gain value and the operating frequency of the LC tracking filter of FIG. 4A. As shown in FIG. 4B, the LC tracking filter has better rejection in high frequency. However, the uses of two inductors Li and Lp increase the fabricating cost of the LC tracking filter.

Figures 4C, 4D:
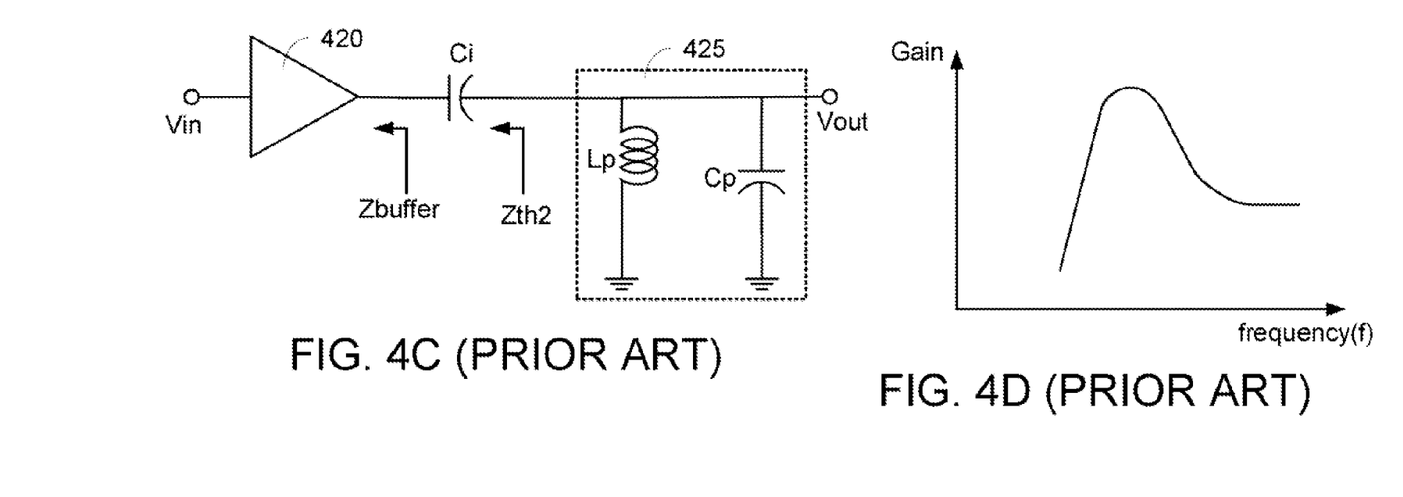
FIG. 4C is a schematic diagram illustrating another conventional LC tracking filter.
FIG. 4D is a schematic plot illustrating the relationship between the gain value and the operating frequency of the LC tracking filter of FIG. 4C.

This LC tracking filter of FIG. 4C has better linearity. As shown in FIG. 4C, the LC tracking filter comprises a buffer 420, an impedance transformer Ci and a resonator 425. The resonator 425 comprises an inductor Lp and a capacitor Cp. A signal input terminal Vin is connected with the buffer 420. The impedance transformer Ci is interconnected between the output terminal of the buffer 420 and a signal output terminal Vout. The inductor Lp and the capacitor Cp are interconnected between the signal output terminal Vout and a ground terminal. Moreover, since the impedance value Zbuffer of the buffer 420 is low, the use of the impedance transformer Ci with a low capacitance value may increase the impedance value to Zth2.

FIG. 4D is a schematic plot illustrating the relationship between the gain value and the operating frequency of the LC tracking filter of FIG. 4C. As shown in FIG. 4D, the LC tracking filter has inferior rejection in high frequency. In addition, the LC tracking filter is readily suffered from harmonic interferences of the local oscillation signal LO.

Moreover, since the performance of the tracking filter is affected by many factors (e.g. temperature, process variation and parasitic effect of the printed circuit board), the tracking filter needs to be calibrated once the user wants to use the tracking filter. As known, it is time-consuming to calibrate the tracking filter. In addition, the calibration circuit is very complicated.

SUMMARY OF THE INVENTION

Therefore, the present invention provides a high-linearity tracking filter and a digital calibration device thereof. The tracking filter of the present invention has better rejection in high frequency by using only an inductor. In addition, the use of the digital calibration device is capable of shortening the time of calibrating the tracking filter.

In accordance with an aspect, the present invention provides a tracking filter of a TV tuner. The tracking filter includes a first buffer, an impedance transformer, an inductor, a first capacitive unit, a second capacitive unit and a second buffer. The first buffer has an input terminal for receiving an input signal. The impedance transformer has a first terminal connected with an output terminal of the first buffer. The inductor has a first terminal connected with a second terminal of the impedance transformer. The first capacitive unit is interconnected between the second terminal of the impedance transformer and a ground terminal. The second capacitive unit is interconnected between a second terminal of the inductor and the ground terminal. The second buffer has an input terminal connected with the second terminal of the inductor and an output terminal for generating an output signal. When specified values of the impedance transformer, the first capacitive unit and the second capacitive unit are simultaneously increased, an operating frequency of the output signal is decreased, so that a gain value of the output signal to the input signal is maintained constant.

In accordance with another aspect, the present invention provides a digital calibration device of a TV tuner. The digital calibration device includes a tracking filter, a frequency detector and a controlling circuit. The tracking filter includes a first buffer having an input terminal and an output terminal, an impedance transformer having a first terminal connected with the output terminal of the first buffer, an inductor having a first terminal connected with a second terminal of the impedance transformer, a first capacitive unit interconnected between the second terminal of the impedance transformer and a ground terminal, a second capacitive unit interconnected between a second terminal of the inductor and the ground terminal, a resistive unit interconnected between the first terminal and the second terminal of the inductor, and a second buffer having an input terminal connected with the second terminal of the inductor. The frequency detector is connected with the inductor for receiving a first oscillation signal with a first oscillation frequency and receiving a local oscillation signal with a reference frequency, thereby generating a counting signal. The controlling circuit is used for receiving the counting signal and generating a control signal according to the counting signal. According to the control signal, a specified value of the impedance transformer, the first capacitive unit or the second capacitive unit is adjusted, so that the first oscillation frequency of the first oscillation signal is close to the reference frequency.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 5A:
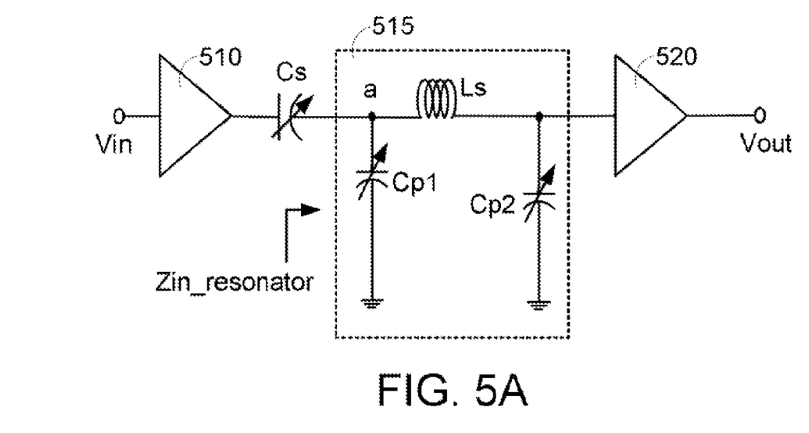
FIG. 5A is a schematic diagram illustrating a tracking filter according to a first embodiment of the present invention.

FIG. 5A is a schematic diagram illustrating a tracking filter according to a first embodiment of the present invention. As shown in FIG. 5A, the tracking filter comprises a first buffer 510, a second buffer 520, an impedance transformer Cs and a resonator 515. The resonator 515 comprises an inductor Ls, a first capacitive unit Cp1 and a second capacitive unit Cp2. A signal input terminal Vin is connected with the input terminal of the first buffer 510, so that the first buffer 510 may receive an input signal.

The impedance transformer Cs is interconnected between the output terminal of the first buffer 510 and a connecting node "a". The inductor Ls is interconnected between the connecting node "a" and the input terminal of the second buffer 520. The first capacitive unit Cp1 is interconnected between the connecting node "a" and a ground terminal. The second capacitive unit Cp2 is interconnected between the input terminal of the second buffer 520 and the ground terminal. The output terminal of the second buffer 520 is used as a signal output terminal Vout for issuing an output signal.

In this embodiment, the first buffer 510 and the second buffer 520 are source followers. The first buffer 510 is used to avoid reduction of the linearity of the resonator 515. The second buffer 520 is used for isolating the parasitic effect between the back-end circuit and the circuit board. The impedance transformer Cs is a third capacitive unit. The capacitance values of the first capacitive unit Cp1, the second capacitive unit Cp2 and the third capacitive unit are adjustable.

As shown in FIG. 5A, it is found that the relationship between the voltage Va at the node "a" and the input voltage Vin complies with the following formula:

$$Va = \frac{Zin\_resonator}{1/j\omega Cs + Zin\_resonator} \cdot Vin$$

where, Zin_resonator is the impedance of the resonator, and Cs is the capacitance value of the impedance transformer Cs.

The operating frequency (i.e. a resonance frequency) of the tracking filter is obtained by the following formula:

$$fresonance = \frac{1}{2\pi\sqrt{Ls \cdot \frac{(Cs+Cp1) \cdot Cp2}{Cs+Cp1+Cp2}}}$$

where, Ls is the inductance value of the inductor Ls, and Cp1, Cp2 and Cs are the capacitance values of the first capacitive unit Cp1, the second capacitive unit Cp2 and the impedance transformer Cs, respectively.

That is, the output signal includes the operating frequency. According to the above two formulae, it is found that the gain of the tracking filter and the operating frequency are changeable by adjusting the capacitance value of the impedance transformer Cs.

Figure 5B:
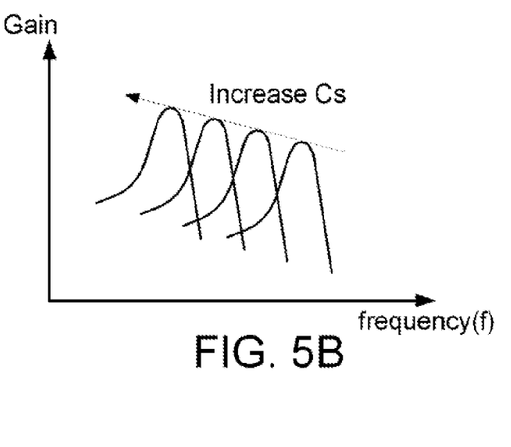
FIGS. 5B, 5C and 5D are schematic plots illustrating the relationships between the gain value and the operating frequency of the tracking filter according to the first embodiment of the present invention.
Figure 5C:
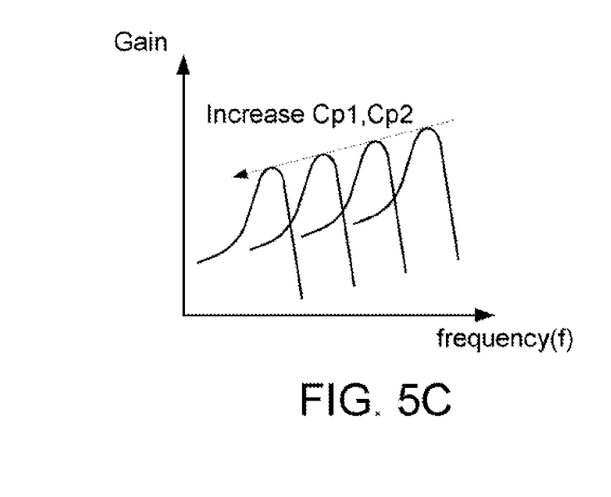
Figure 5D:
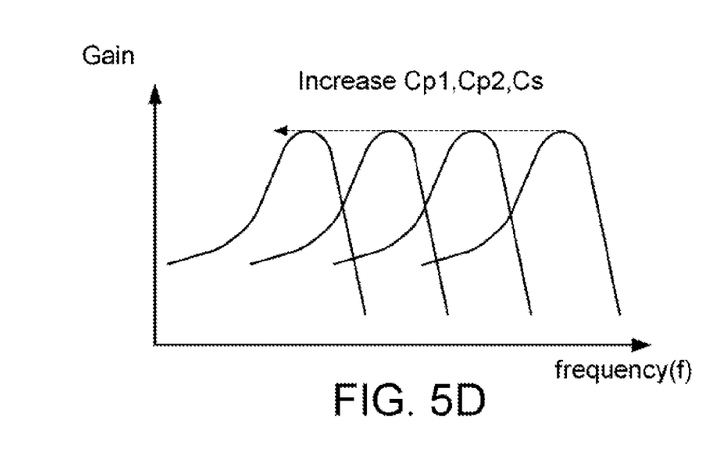

FIGS. 5B, 5C and 5D are schematic plots illustrating the relationships between the gain value and the operating frequency of the tracking filter according to the first embodiment of the present invention. As shown in FIG. 5B, if the capacitance values of the first capacitive unit Cp1 and the second capacitive unit Cp2 are unchanged but the capacitance value of the impedance transformer Cs is increased, the operating frequency (fresonance) is decreased but the gain value is increased. Similarly, by changing the capacitance values of the first capacitive unit Cp1 and the second capacitive unit Cp2, the gain value and the operating frequency of the tracking filter are adjustable. For example, as shown in FIG. 5C, if the capacitance values of the first capacitive unit Cp1 and the second capacitive unit Cp2 are increased, both of the operating frequency and the gain value are decreased. Whereas, as shown in FIG. 5D, if all of the capacitance values of the first capacitive unit Cp1, the second capacitive unit Cp2 and the impedance transformer Cs are increased, the operating frequency of the tracking filter is decreased but the gain value is substantially kept unchanged. In other words, the gain value of the tracking filter is properly compensated.

Figure 6:
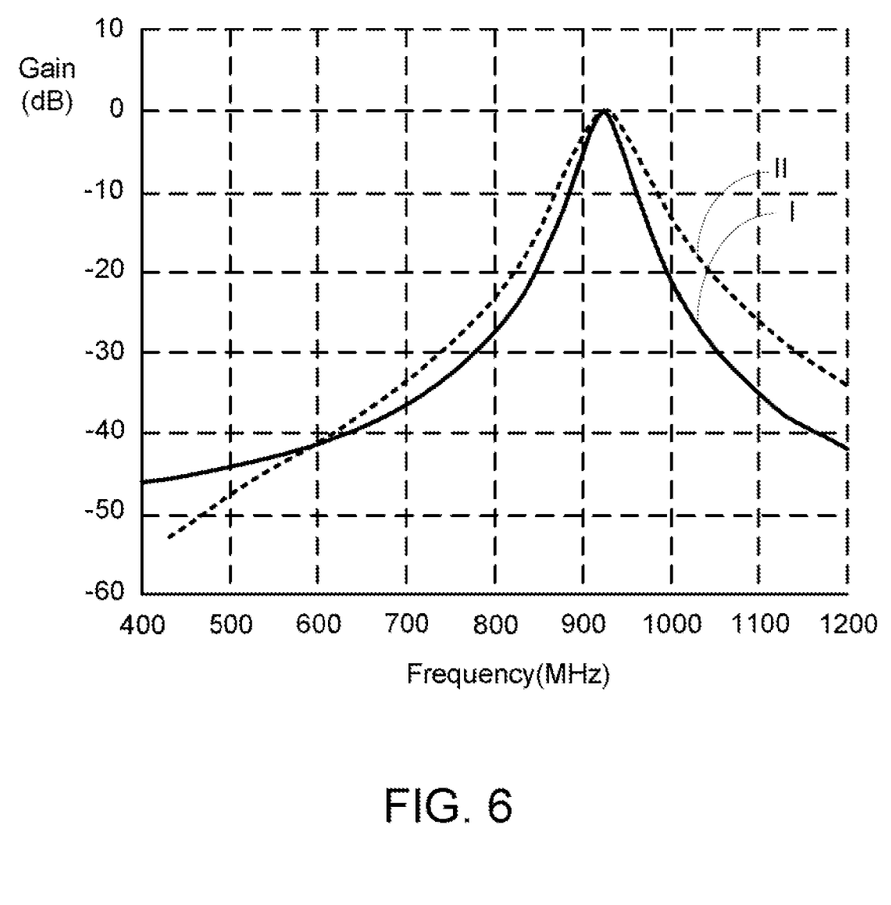
FIG. 6 is a schematic plot illustrating the comparison between the frequency response of the tracking filter of the present invention and the frequency response of the conventional LC parallel type filter.

FIG. 6 is a schematic plot illustrating the comparison between the frequency response of the tracking filter of the present invention and the frequency response of the conventional LC parallel type filter. The curve I indicates the frequency response of the present tracking filter. The curve II indicates the frequency response of the conventional LC parallel type filter. As shown in FIG. 6, it is found that if the operating frequency is fixed, the capacitance value of the first capacitive unit Cp1 and the second capacitive unit Cp2 and the inductance value of the inductor Ls of the resonator 515 of the present tracking filter are higher than the capacitance value and the inductance value of the conventional LC parallel type filter. That is, the resonator 515 of the present tracking filter is less sensitive to the parasitic resistor. As a consequence, the Q factor of the present tracking filter is enhanced to reject more interference and filter off the image band. In addition, when compared with the conventional LC parallel type filter, the resonator 515 of the present tracking filter has better rejection in high frequency to reject more harmonic interferences of the local oscillation signal.

Figure 7A:
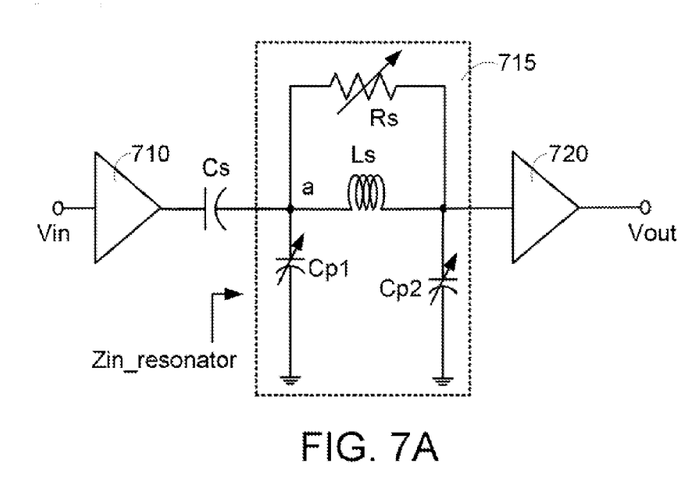
FIG. 7A is a schematic diagram illustrating a tracking filter according to a second embodiment of the present invention.

FIG. 7A is a schematic diagram illustrating a tracking filter according to a second embodiment of the present invention. As shown in FIG. 7A, the tracking filter comprises a first buffer 710, a second buffer 720, an impedance transformer Cs and a resonator 715. The resonator 715 comprises a resistive unit Rs, an inductor Ls, a first capacitive unit Cp1 and a second capacitive unit Cp2. A signal input terminal Vin is connected with the input terminal of the first buffer 710. The impedance transformer Cs is interconnected between the output terminal of the first buffer 710 and a connecting node "a". The inductor Ls is interconnected between the connecting node "a" and the input terminal of the second buffer 720. The resistive unit Rs is interconnected between the connecting node "a" and the input terminal of the second buffer 720. The first capacitive unit Cp1 is interconnected between the connecting node "a" and a ground terminal. The second capacitive unit Cp2 is interconnected between the input terminal of the second buffer 720 and the ground terminal. The output terminal of the second buffer 720 is used as a signal output terminal Vout.

In this embodiment, the first buffer 710 and the second buffer 720 are source followers. The first buffer 710 is used to avoid reduction of the linearity of the resonator 715. The second buffer 720 is used for isolating the parasitic effect between the back-end circuit and the circuit board. The impedance transformer Cs is a third capacitive unit. The capacitance value of the third capacitive unit. The capacitance values of the first capacitive unit Cp1 and the second capacitive unit Cp2 are adjustable. In addition, the resistance value of the resistive unit Rs is adjustable.

As shown in FIG. 7A, it is found that the relationship between the voltage Va at the node "a" and the input voltage Vin complies with the following formula:

$$Va = \frac{\text{Zin\_resonator}}{1/j\omega Cs + \text{Zin\_resonator}} \cdot Vin$$

where, Zin_resonator is the impedance of the resonator, and Cs is the capacitance value of the impedance transformer Cs.

The operating frequency (i.e. a resonance frequency) of the tracking filter is obtained by the following formula:

$$fresonance = \frac{1}{2\pi \sqrt{Ls \cdot \frac{(Cs+Cp1) \cdot Cp2}{Cs+Cp1+Cp2}}}$$

where, Ls is the inductance value of the inductor Ls, and Cp1, Cp2 and Cs are the capacitance values of the first capacitive unit Cp1, the second capacitive unit Cp2 and the impedance transformer Cs, respectively.

Figure 7B:
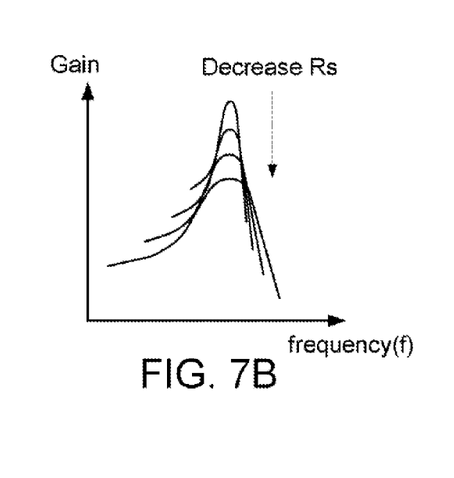
FIGS. 7B, 7C and 7D are schematic plots illustrating the relationships between the gain value and the operating frequency of the tracking filter according to the second embodiment of the present invention.
Figure 7C:
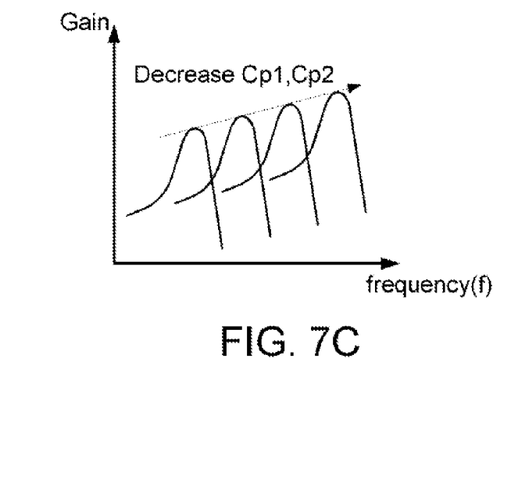
Figure 7D:
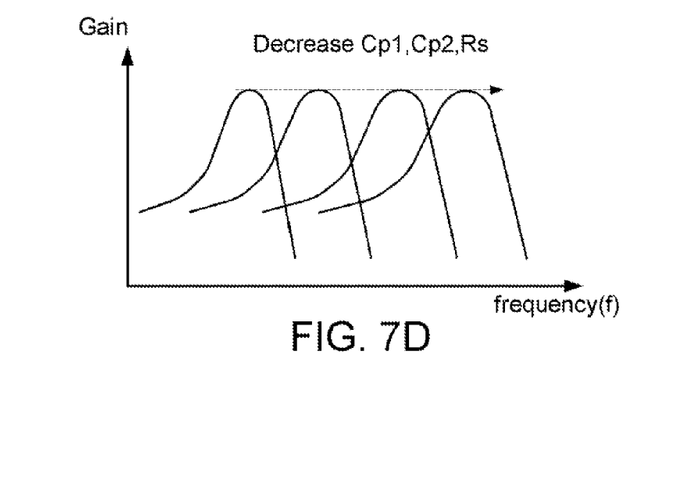

FIGS. 7B, 7C and 7D are schematic plots illustrating the relationships between the gain value and the operating frequency of the tracking filter according to the second embodiment of the present invention. As shown in FIG. 7B, if the resistance value of the resistive unit Rs is decreased, the operating frequency (fresonance) is unchanged but the gain value is decreased. Since the gain value is decreased, the Q quality of the tracking filter is impaired. Similarly, by changing the capacitance values of the first capacitive unit Cp1 and the second capacitive unit Cp2, the gain value and the operating frequency of the tracking filter are adjustable. For example, as shown in FIG. 7C, if the capacitance values of the first capacitive unit Cp1 and the second capacitive unit Cp2 are decreased, both of the operating frequency and the gain value are increased. Whereas, as shown in FIG. 7D, if all of the resistance value of the resistive unit Rs and the capacitance values of the first capacitive unit Cp1, the second capacitive unit Cp2 and the impedance transformer Cs are decreased, the operating frequency of the tracking filter is increased but the gain value is substantially kept unchanged. In other words, the gain value of the tracking filter is properly compensated.

It is noted that the features of the first embodiment and the second embodiment may be combined together. That is, the capacitance values of the first capacitive unit Cp1, the second capacitive unit Cp2 and the impedance transformer Cs and the resistance value of the resistive unit Rs are adjustable to achieve the purpose of compensating the gain value.

Figure 8A:
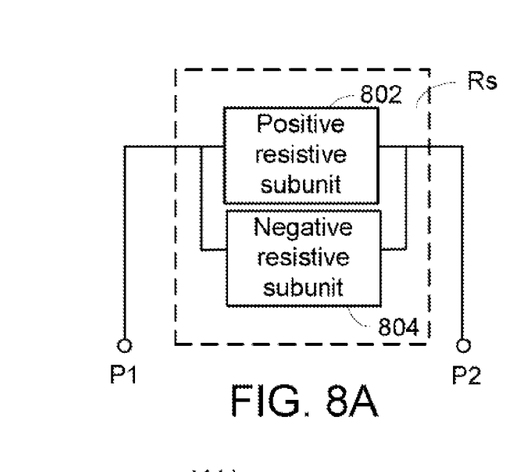
FIG. 8A is a schematic circuit diagram illustrating a resistive unit of a tracking filter according to the present invention.

Please refer to FIG. 7B again. The Q factor of the tracking filter may be controlled by the resistive unit Rs. Therefore, the resistive unit Rs further comprises a positive resistive subunit and a negative resistive subunit. FIG. 8A is a schematic circuit diagram illustrating a resistive unit of a tracking filter according to the present invention. As shown in FIG. 8A, both ends of the resistive unit Rs are connected with a first node P1 and a second node P2, respectively. In addition, the resistive unit Rs comprises a positive resistive subunit 802 and a negative resistive subunit 804. The positive resistive subunit 802 and the negative resistive subunit 804 are connected between the nodes P1 and P2 in parallel.

Figure 8B:
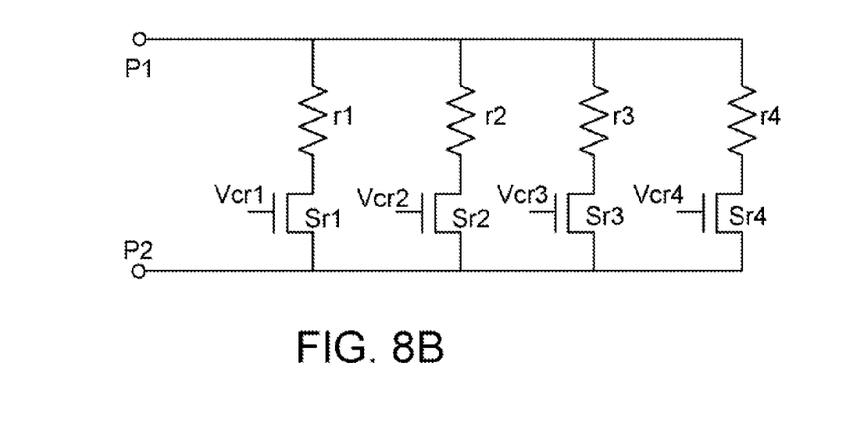
FIG. 8B is a schematic circuit diagram illustrating an exemplary positive resistive subunit of the resistive unit of FIG. 8A.

FIG. 8B is a schematic circuit diagram illustrating an exemplary positive resistive subunit of the resistive unit of FIG. 8A. In this embodiment, the positive resistive subunit has four parallel resistive paths. The first resistive path comprises a first resistor r1 and a first resistive switch Sr1. The second resistive path comprises a second resistor r2 and a second resistive switch Sr2. The third resistive path comprises a third resistor r3 and a third resistive switch Sr3. The fourth resistive path comprises a fourth resistor r4 and a third resistive switch Sr4. The resistive switches Sr1~Sr4 are controlled by four resistive control signals Vcr1~Vcr4, so that a desired positive resistance value is acquired. Of course, the number of the resistive paths of the positive resistive subunit may be varied according to the practical requirements.

Figure 8C:
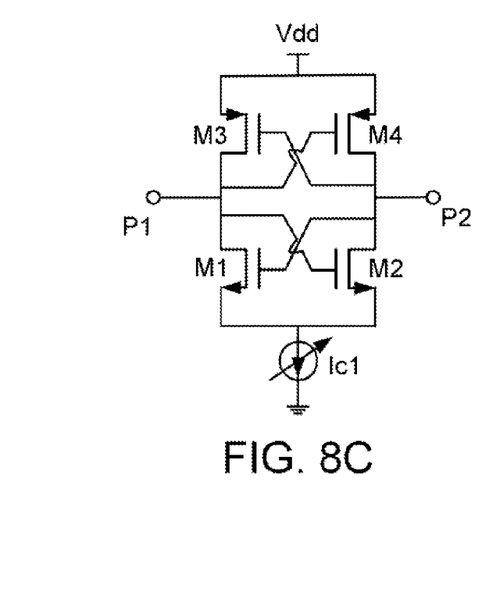
FIG. 8C is a schematic circuit diagram illustrating an exemplary negative resistive subunit of the resistive unit of FIG. 8A.

FIG. 8C is a schematic circuit diagram illustrating an exemplary negative resistive subunit of the resistive unit of FIG. 8A. As shown in FIG. 8C, the negative resistive subunit comprises a first transistor M1, a second transistor M2, a third transistor M3, a fourth transistor M4 and a controllable current source Ic1. The source of the first transistor M1 is connected with the source of the second transistor M2. The gate of the first transistor M1 is connected with the drain of the second transistor M2 and the second node P2. The drain of the first transistor M1 is connected with the gate of the second transistor M2 and the first node P1. The source of the third transistor M3 is connected with the source of the fourth transistor M4 and a voltage source Vdd. The gate of the third transistor M3 is connected with the drain of the fourth transistor M4 and the second node P2. The drain of the third transistor M3 is connected with the gate of the fourth transistor M4 and the first node P1. The controllable current source Ic1 is interconnected between the source of the first transistor M1 and a ground terminal. As the current provided by the controllable current source Ic1 is increased, the negative resistance value provided by the negative resistive subunit is decreased.

Since the positive resistive subunit 802 and the negative resistive subunit 804 are connected with each other in parallel, the practical equivalent resistance value is higher than the resistance value of the positive resistive subunit 802. Consequently, in a case that the tracking filter is operated in the high frequency band, the increase of the resistance value of the resistive unit Rs may enhance the Q quality of the tracking filter, thereby providing better rejection in high frequency and effectively filtering off the image band.

Figure 9:
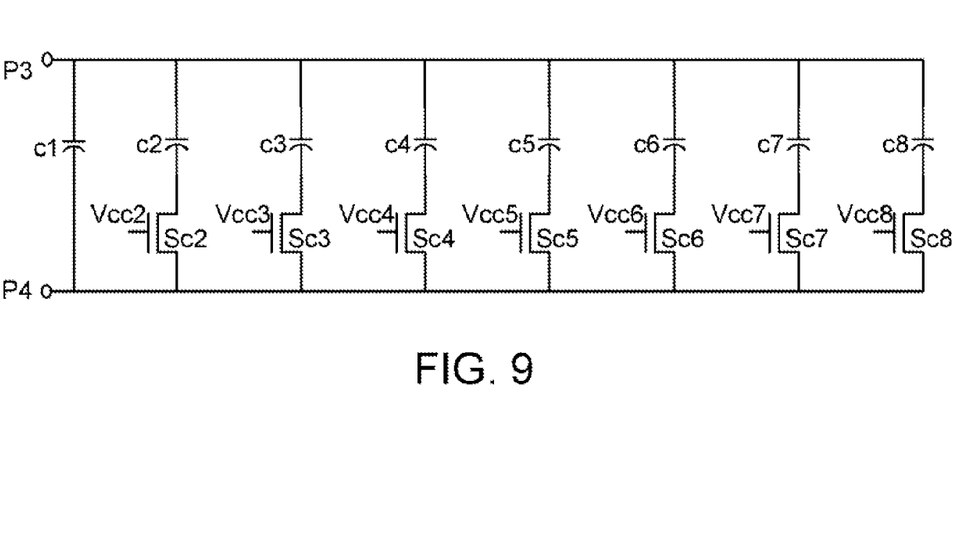
FIG. 9 is a schematic circuit diagram illustrating an exemplary capacitive unit of a tracking filter according to the present invention.

FIG. 9 is a schematic circuit diagram illustrating an exemplary capacitive unit of a tracking filter according to the present invention. The capacitive unit of FIG. 9 may be applied to control the capacitance value of the first capacitive unit Cp1, the second capacitive unit Cp2 or the impedance transformer Cs. In this embodiment, the capacitive unit comprises eight capacitive paths, which are connected between a third node P3 and a fourth node P4 in parallel. The first capacitive path comprises a first capacitor c1. The second capacitive path comprises a second capacitor c2 and a second capacitive switch Sc2. The third capacitive path comprises a third capacitor c3 and a third capacitive switch Sc3. The fourth capacitive path comprises a fourth capacitor c4 and a fourth capacitive switch Sc4. The fifth capacitive path comprises a fifth capacitor c5 and a fifth capacitive switch Sc5. The sixth capacitive path comprises a sixth capacitor c6 and a sixth capacitive switch Sc6. The seventh capacitive path comprises a seventh capacitor c7 and a seventh capacitive switch Sc7. The eighth capacitive path comprises an eighth capacitor c8 and an eighth capacitive switch Sc8. The capacitive switches Sc2~Sc8 are controlled by seven capacitive control signals Vcc2~Vcc8, so that a desired capacitance value is acquired. Of course, the number of the capacitive paths of the capacitive unit may be varied according to the practical requirements.

Figure 10A:
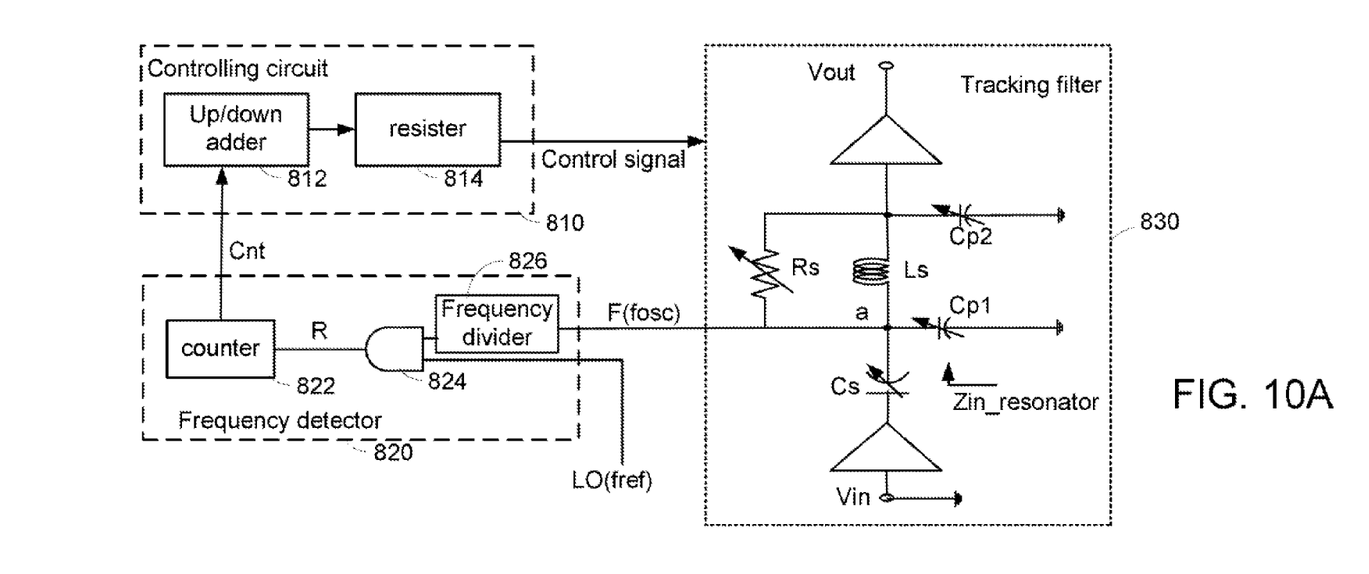
FIG. 10A is a schematic circuit block diagram illustrating a calibration device of a tracking filter according to an embodiment of the present invention.

FIG. 10A is a schematic circuit block diagram illustrating a calibration device of a tracking filter according to an embodiment of the present invention. As shown in FIG. 10A, the calibration device comprises a controlling circuit 810 and a frequency detector 820. The controlling circuit 810 comprises an up/down adder 812 and a register 814. The frequency detector 820 comprises a counter 822, an AND gate 824 and a frequency divider 826. A first oscillation signal F with a frequency fosc is outputted from a tracking filter 830. A local oscillation signal LO with a frequency fref is outputted from a RF clock synthesizer. The first oscillation signal F and the local oscillation signal LO are received by the frequency detector 820.

In this embodiment, a control signal is outputted from the controlling circuit 810. According to the control signal, the values of the resistive unit Rs, the first capacitive unit Cp1, the second capacitive unit Cp2 and the impedance transformer Cs of the tracking filter 830 are adjusted. Consequently, the first oscillation signal F is outputted from the node "a" of the tracking filter 830. It is noted that the first oscillation signal F may be outputted from the input terminal of the second buffer.

After the first oscillation signal F is received by the frequency divider 826, the frequency fosc is divided by N, and thus a frequency divided signal Fd is issued from the frequency divider 826 to the first input terminal of the AND gate 824. The local oscillation signal LO is inputted into a second input terminal of the AND gate 824. Consequently, a resulting signal R is issued from the output terminal of the AND gate 824 to the counter 822. According to the resulting signal R, the counter 822 issues a counting signal Cnt to the controlling circuit 810.

According to the counting signal Cnt, the up/down adder 812 will judge the frequency relationship between the first oscillation signal F and the local oscillation signal LO, thereby setting the register 814. Consequently, the register 814 will adjust the control signal and the frequency fosc of the first oscillation signal F. In accordance with the present invention, during the calibration process is performed, no input signal is received by the tracking filter 830. Moreover, according to the control signal, the resistance value of the resistive unit Rs is set to be a negative resistance value, and thus the real part of the impedance Zin_resonator of the resonator is lower than zero. Consequently, the tracking filter 830 oscillates to generate the first oscillation signal F. Meanwhile, the oscillation frequency fosc is the operating frequency of the tracking filter 830.

Figure 10B:
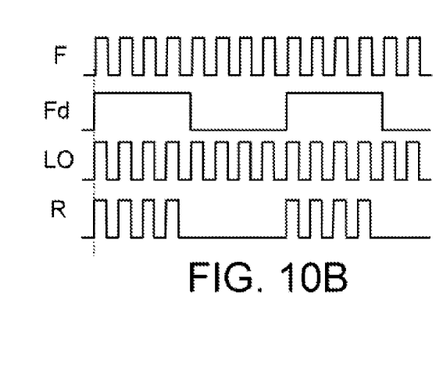
FIGS. 10B, 10C and 10D are schematic timing waveform diagrams illustrating the relationships between the first oscillation signal F, the frequency divided signal Fd, the local oscillation signal LO and the resulting signal R processed by the calibration device of FIG. 10A.
Figure 10C:
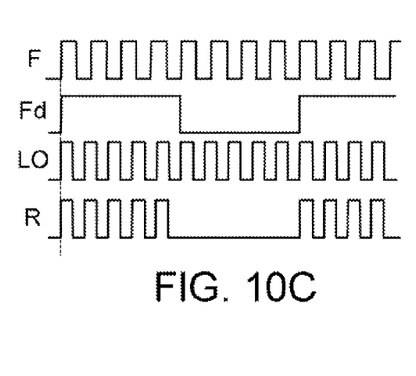
Figure 10D:
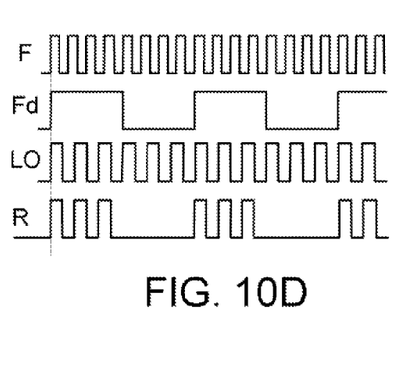

FIGS. 10B, 10C and 10D are schematic timing waveform diagrams illustrating the relationships between the first oscillation signal F, the frequency divided signal Fd, the local oscillation signal LO and the resulting signal R processed by the calibration device of FIG. 10A. Assuming that N=8, one cycle of the Fd from the frequency divider 826 is equal to eight cycles of the first oscillation signal F.

Please refer to FIG. 10B. In the situation, the frequency fref of the local oscillation signal LO is equal to the frequency fosc of the first oscillation signal F. After the frequency divided signal Fd and the local oscillation signal LO are processed by the AND gate 824, four pulses are generated in response to the high-level state of the frequency divided signal Fd. Consequently, the counting signal Cnt outputted from the counter 822 is equal to 4 (=N/2). In other words, during one cycle of the frequency divided signal Fd, the obtained counting signal Cnt is 4.

Please refer to FIG. 10C. In the situation, the frequency fosc of the first oscillation signal F is lower than the frequency fref of the local oscillation signal LO. After the frequency divided signal Fd and the local oscillation signal LO are processed by the AND gate 824, more than four pulses (e.g. five pulses) are generated in response to the high-level state of the frequency divided signal Fd. Consequently, the counting signal Cnt outputted from the counter 822 is higher than 4 (=N/2). In other words, four counting signals Cnt are generated during one cycle of the frequency divided signal Fd. In other words, during one cycle of the frequency divided signal Fd, the obtained counting signal Cnt is higher than 4.

Please refer to FIG. 10D. In the situation, the frequency fosc of the first oscillation signal F is higher than the frequency fref of the local oscillation signal LO. After the frequency divided signal Fd and the local oscillation signal LO are processed by the AND gate 824, less than four pulses (e.g. three pulses) are generated in response to the high-level state of the frequency divided signal Fd. Consequently, the counting signal Cnt outputted from the counter 822 is lower than 4 (=N/2). In other words, during one cycle of the frequency divided signal Fd, the obtained counting signal Cnt is lower than 4.

According to the above features, the up/down adder 812 of the controlling circuit 810 may realize the relationship between the frequency fosc of the first oscillation signal F and the frequency fref of the local oscillation signal LO according to the counting signal Cnt, thereby setting the register 814 and a corresponding control signal.

It is noted that numerous modifications and alterations of the frequency detector 820 may be made while retaining the teachings of the invention. For example, in some embodiments, the local oscillation signal LO is received and processed by the frequency divider 826 to generate a frequency divided signal Fd, and the first oscillation signal F and the frequency divided signal Fd are processed by the AND gate 824 to generate a resulting signal. Alternatively, in some embodiments, the AND gate 824 is replaced by another logic gate (e.g. an NAND gate or a XOR gate.

Figure 11:
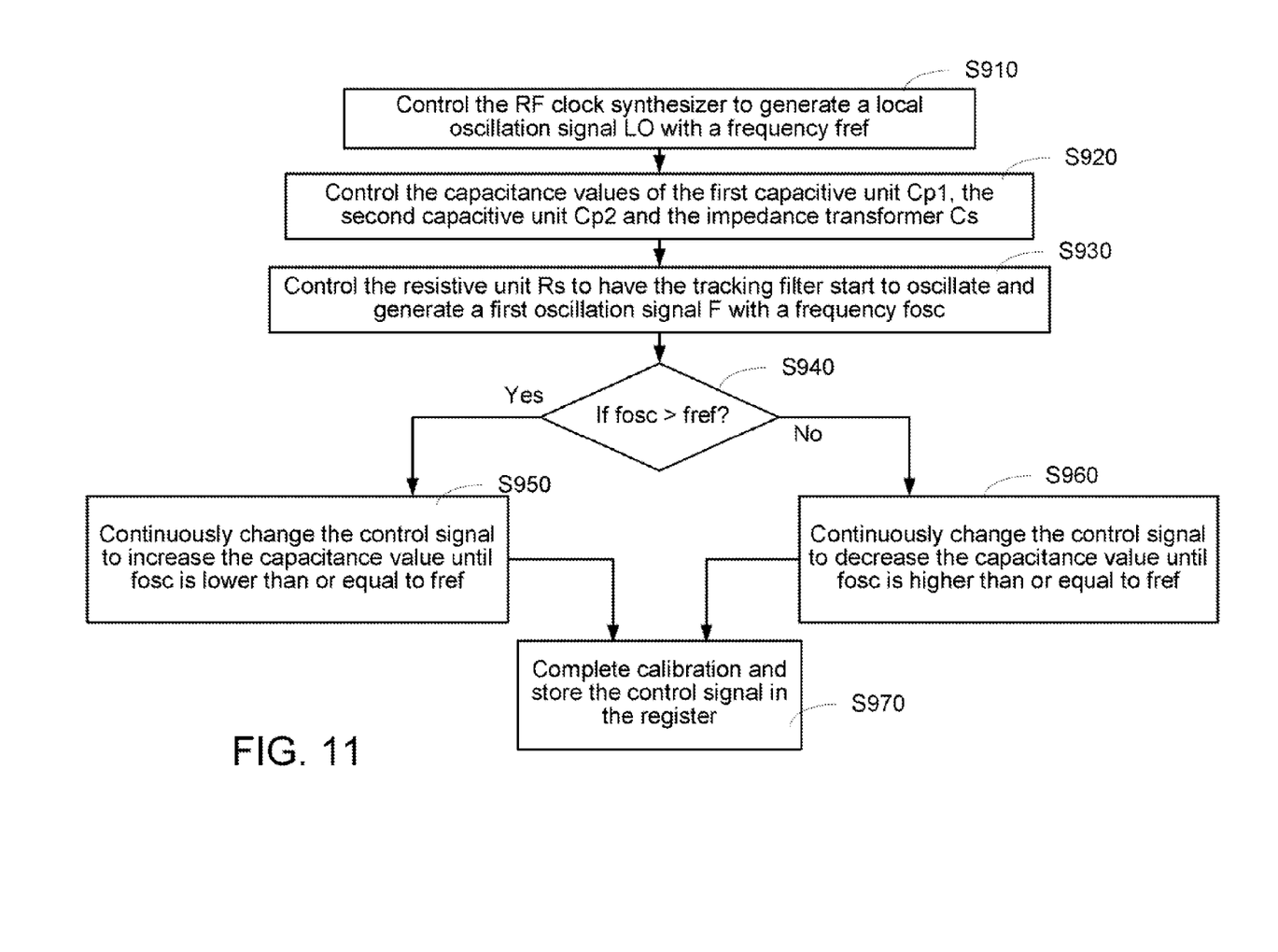
FIG. 11 is a flowchart illustrating a process of calibrating a tracking filter according to an embodiment of the present invention.

FIG. 11 is a flowchart illustrating a process of calibrating a tracking filter according to an embodiment of the present invention. Firstly, the RF clock synthesizer is controlled to generate a local oscillation signal LO with a frequency fref (Step S910). Then, the capacitance values of the first capacitive unit Cp1, the second capacitive unit Cp2 and the impedance transformer Cs are controlled according to a control signal (Step S920). Then, the resistive unit Rs is controlled according to the control signal, so that the tracking filter starts to oscillate and generates a first oscillation signal F with a frequency fosc (Step S930).

Then, the frequency detector judges the frequency relationship between the frequency fref of the local oscillation signal LO and the frequency fosc of the first oscillation signal F (Step S940). If fosc is higher than fref, the frequency fosc of the first oscillation signal F needs to be decreased. By continuously increasing the capacitance value of the first capacitive unit Cp1, the second capacitive unit Cp2 or the impedance transformer Cs, the frequency fosc of the first oscillation signal F will be decreased. In addition, the frequency relationship is continuously judged by the frequency detector until fosc is lower than or equal to fref according to the changed control signal (Step S950).

Whereas, if fosc is lower than fref, the frequency fosc of the first oscillation signal F needs to be increased. By continuously decreasing the capacitance value of the first capacitive unit Cp1, the second capacitive unit Cp2 or the impedance transformer Cs, the frequency fosc of the first oscillation signal F will be increased. In addition, the frequency relationship is continuously judged by the frequency detector until fosc is high than or equal to fref according to the changed control signal (Step S960).

After the calibration is completed, the control signal is stored in the register (Step S970). It is assured that the operating frequency of the tracking filter is adjusted to fref according to the control signal corresponding to the capacitance values of the first capacitive unit Cp1, the second capacitive unit Cp2 and the impedance transformer Cs.

From the above description, the present invention provides a high-linearity tracking filter and a digital calibration device thereof. The tracking filter of the present invention has better rejection in high frequency by using only an inductor. In addition, the use of the digital calibration device is capable of shortening the time of calibrating the tracking filter.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tracking filter of a TV tuner, the tracking filter comprising:
    a first buffer having an input terminal for receiving an input signal;
    an impedance transformer having a first terminal connected with an output terminal of the first buffer;
    an inductor having a first terminal connected with a second terminal of the impedance transformer;
    a first capacitive unit interconnected between the second terminal of the impedance transformer and a ground terminal;
    a second capacitive unit interconnected between a second terminal of the inductor and the ground terminal; and
    a second buffer having an input terminal connected with the second terminal of the inductor and an output terminal for generating an output signal,
    wherein when specified values of the impedance transformer, the first capacitive unit and the second capacitive unit are simultaneously increased, an operating frequency of the output signal is decreased, so that a gain value of the output signal to the input signal is maintained constant.

2. The tracking filter according to claim 1, wherein the tracking filter further comprises a resistive unit, which is connected with the inductor in parallel, wherein when a resistance value of the resistive unit is decreased, the gain value and a Q factor are both decreased.

3. The tracking filter according to claim 2, wherein the resistive unit comprises a positive resistive subunit and a negative resistive subunit, which are connected with each other in parallel.

4. The tracking filter according to claim 3, wherein the positive resistive subunit comprises plural resistive paths, which are connected between a first node and a second node in parallel, wherein each of the resistive paths comprises a resistor and a resistive switch connected with each other, and the resistive switch is controlled according to a corresponding resistive control signal.

5. The tracking filter according to claim 4, wherein the negative resistive subunit comprises a first transistor, a second transistor, a third transistor, a fourth transistor and a controllable current source, wherein the source of the first transistor is connected with the source of the second transistor, the gate of the first transistor is connected with the drain of the second transistor and the second node, the drain of the first transistor is connected with the gate of the second transistor and the first node, the source of the third transistor is connected with the source of the fourth transistor and a voltage source, the gate of the third transistor is connected with the drain of the fourth transistor and the second node, the drain of the third transistor is connected with the gate of the fourth transistor and the first node, and the controllable current source is interconnected between the source of the first transistor and the ground terminal.

6. The tracking filter according to claim 1, wherein the impedance transformer is a third capacitive unit, wherein when a capacitance value of the third capacitive unit is increased, the operating frequency of the output signal is increased but the gain value is increased.

7. The tracking filter according to claim 6, wherein the operating frequency is obtained by the following formula:

$$fresonance = \frac{1}{2\pi\sqrt{Ls \cdot \frac{(Cs + Cp1) \cdot Cp2}{Cs + Cp1 + Cp2}}}$$

where, Ls is the inductance value of the inductor, Cp1 is a capacitance value of the first capacitive unit, Cp2 is a capacitance value of the second capacitive unit, and Cs is the capacitance value of the third capacitive unit.

8. The tracking filter according to claim 6, wherein each of the first capacitive unit, the second capacitive unit and the third capacitive unit comprises a first capacitor and plural capacitive paths, which are connected between a third node and a fourth node in parallel, wherein each of the capacitive paths comprises a capacitor and a capacitive switch connected with each other, and the capacitive switch is controlled according to a corresponding capacitive control signal.

9. A digital calibration device of a TV tuner, the digital calibration device comprising:
   a tracking filter comprising:
   a first buffer having an input terminal and an output terminal;
   an impedance transformer having a first terminal connected with the output terminal of the first buffer;
   an inductor having a first terminal connected with a second terminal of the impedance transformer;
   a first capacitive unit interconnected between the second terminal of the impedance transformer and a ground terminal;
   a second capacitive unit interconnected between a second terminal of the inductor and the ground terminal;
   a resistive unit interconnected between the first terminal and the second terminal of the inductor; and
   a second buffer having an input terminal connected with the second terminal of the inductor;
   a frequency detector connected with the inductor for receiving a first oscillation signal with a first oscillation frequency and receiving a local oscillation signal with a reference frequency, thereby generating a counting signal; and
   a controlling circuit for receiving the counting signal and generating a control signal according to the counting signal, wherein according to the control signal, a specified value of the impedance transformer, the first capacitive unit or the second capacitive unit is adjusted, so that the first oscillation frequency of the first oscillation signal is close to the reference frequency.

10. The digital calibration device according to claim 9, wherein according to the control signal, the resistive unit has a negative resistance value, so that the tracking filter oscillates.

11. The digital calibration device according to claim 9, wherein the operating frequency is obtained by the following formula:

$$fresonance = \frac{1}{2\pi\sqrt{Ls \cdot \frac{(Cs + Cp1) \cdot Cp2}{Cs + Cp1 + Cp2}}}$$

where, Ls is the inductance value of the inductor, Cp1 is a capacitance value of the first capacitive unit, Cp2 is a capacitance value of the second capacitive unit, and Cs is a value of the impedance transformer.

12. The digital calibration device according to claim 9, wherein the frequency detector comprises:
   a frequency divider for receiving a first oscillation signal, thereby generating a frequency divided signal;
   an AND gate having a first input terminal for receiving the frequency divided signal and a second input terminal for receiving the local oscillation signal, thereby generating a resulting signal; and
   a counter for receiving the resulting signal, thereby generating the counting signal.

13. The digital calibration device according to claim 12, wherein the controlling circuit comprises:
   a register; and
   an up/down adder for receiving the counting signal and setting the register according to the counting signal, so that the control signal is outputted from the register.

14. The digital calibration device according to claim 13, wherein if the counting signal is higher than a predetermined value, the value of the first capacitive unit or the second capacitive unit is continuously decreased according to the control signal until the first oscillation frequency is higher than or equal to the reference frequency, wherein if the counting signal is lower than the predetermined value, the value of the first capacitive unit or the second capacitive unit is continuously increased according to the control signal until the first oscillation frequency is lower than or equal to the reference frequency.

* * * * *